(12) United States Patent
Konda (10) Patent No.: US 8,705,558 B2
(45) Date of Patent: Apr. 22, 2014

(54) SWAPPING BANDWIDTH RESERVATIONS

(75) Inventor: Praveen Kumar Konda, Chandler, AZ (US)

(73) Assignee: Cisco Technology, Inc., San Jose, CA (US)

( * ) Notice: Subject to any disclaimer, the term of this patent is extended or adjusted under 35 U.S.C. 154(b) by 1639 days.

(21) Appl. No.: 11/421,630

(22) Filed: Jun. 1, 2006

(65) Prior Publication Data

US 2007/0280289 A1 Dec. 6, 2007

(51) Int. Cl.
*H04J 3/16* (2006.01)

(52) U.S. Cl.
USPC .......................................................... 370/437

(58) Field of Classification Search
USPC ............... 370/395.41, 395.42, 431, 433, 437, 370/443; 455/509
See application file for complete search history.

(56) References Cited

U.S. PATENT DOCUMENTS

| | | | |
|---|---|---|---|
| 5,471,318 A | 11/1995 | Ahuja et al. | |
| 5,483,587 A | 1/1996 | Hogan et al. | 379/202 |
| 5,483,588 A | 1/1996 | Eaton et al. | |
| 5,491,797 A | 2/1996 | Thompson et al. | 395/200.03 |
| 5,546,449 A | 8/1996 | Hogan et al. | 379/202 |
| 5,757,781 A | 5/1998 | Gilman et al. | 370/260 |
| 5,903,637 A | 5/1999 | Hogan et al. | 379/203 |
| 5,933,417 A | 8/1999 | Rottoo | 370/260 |
| 5,951,637 A | 9/1999 | Kuzma | 709/204 |
| 5,963,913 A | 10/1999 | Henneuse et al. | 705/9 |
| 5,978,463 A | 11/1999 | Jurkevics et al. | 379/202.01 |
| 6,016,478 A | 1/2000 | Zhang et al. | 705/9 |
| 6,038,304 A | 3/2000 | Hart | 379/202.01 |
| 6,105,054 A | 8/2000 | Kawashima | |
| 6,163,692 A | 12/2000 | Chakrabarti et al. | 455/416 |
| 6,195,117 B1 | 2/2001 | Miyazaki | 348/14.09 |
| 6,205,122 B1 | 3/2001 | Sharon et al. | 370/254 |
| 6,215,782 B1 | 4/2001 | Buskens et al. | 370/350 |
| 6,282,278 B1 | 8/2001 | Doganata et al. | 379/202 |
| 6,310,859 B1 | 10/2001 | Morita et al. | 370/235 |
| 6,324,169 B1 | 11/2001 | Roy | 370/260 |
| 6,324,517 B1 | 11/2001 | Bingham et al. | 705/8 |
| 6,377,987 B1 | 4/2002 | Kracht | 709/220 |
| 6,411,601 B1 | 6/2002 | Shaffer et al. | 370/230 |
| 6,411,605 B1 | 6/2002 | Vance et al. | 370/261 |
| 6,414,635 B1 | 7/2002 | Stewart et al. | 342/457 |
| 6,441,605 B1 | 8/2002 | Baurand et al. | 324/127 |

(Continued)

FOREIGN PATENT DOCUMENTS

| | | | | |
|---|---|---|---|---|
| EP | 1331785 A1 | 1/2002 | | |
| WO | WO 2004/114662 | 12/2004 | | H04N 7/15 |

OTHER PUBLICATIONS

Dhesikan, Subha, "H.323/RSVP Synchronization for Voice and Video over IP," Cisco Systems EDCS 177305, Revision 2.0, 44 pages, 2002.

(Continued)

*Primary Examiner* — Yong Zhou
(74) *Attorney, Agent, or Firm* — Baker Botts L.L.P.

(57) ABSTRACT

A network includes reservation agents for reserving bandwidth for communication sessions and swapping bandwidth reservations from one communication session to another communication session. After a swap, the recipient communication session proceeds using the bandwidth originally reserved for the donor communication session, while the donor communication session no longer utilizes that bandwidth reservation. By swapping bandwidth reservations, a network may more efficiently use bandwidth in an environment where bandwidth is a limited resource.

23 Claims, 4 Drawing Sheets

(56) References Cited

U.S. PATENT DOCUMENTS

| | | | |
|---|---|---|---|
| 6,466,252 B1 | 10/2002 | Miyazaki | 370/260 |
| 6,480,830 B1 | 11/2002 | Ford et al. | 705/9 |
| 6,516,345 B1 | 2/2003 | Kracht | 709/220 |
| 6,606,305 B1 | 8/2003 | Boyle et al. | 370/260 |
| 6,614,450 B1 | 9/2003 | Vossler | 345/751 |
| 6,687,228 B1 | 2/2004 | Fichou et al. | 370/232 |
| 6,744,460 B1 | 6/2004 | Nimri et al. | 348/14.11 |
| 6,747,976 B1 | 6/2004 | Bensaou et al. | 370/395.4 |
| 6,771,661 B1 | 8/2004 | Chawla et al. | 370/468 |
| 6,772,436 B1 | 8/2004 | Doganata et al. | 725/106 |
| 6,798,753 B1 | 9/2004 | Doganata et al. | 370/260 |
| 6,807,563 B1 | 10/2004 | Christofferson et al. | 709/204 |
| 6,816,469 B1 * | 11/2004 | Kung et al. | 370/260 |
| 6,839,417 B2 | 1/2005 | Weisman et al. | 379/204.01 |
| 6,870,916 B2 | 3/2005 | Henrikson et al. | 379/202.01 |
| 6,876,668 B1 | 4/2005 | Chawla et al. | 370/468 |
| 6,876,734 B1 | 4/2005 | Summers et al. | 379/202.01 |
| 6,986,156 B1 | 1/2006 | Rodriguez et al. | 725/95 |
| 7,009,970 B2 | 3/2006 | Popovich | 370/390 |
| 7,013,338 B1 | 3/2006 | Nag et al. | 709/226 |
| 7,035,230 B1 | 4/2006 | Shaffer et al. | 370/261 |
| 7,085,243 B2 | 8/2006 | Decker et al. | 370/261 |
| 7,130,620 B2 | 10/2006 | Forman et al. | |
| 7,213,050 B1 | 5/2007 | Shaffer et al. | 709/204 |
| 7,228,145 B2 | 6/2007 | Burritt et al. | |
| 7,492,729 B2 | 2/2009 | Shaffer et al. | 370/260 |
| 2002/0069094 A1 | 6/2002 | Bingham | 705/5 |
| 2002/0118688 A1 | 8/2002 | Jagannathan | 370/410 |
| 2002/0143600 A1 | 10/2002 | Dugan | |
| 2002/0188731 A1 | 12/2002 | Potekhin et al. | |
| 2003/0103075 A1 | 6/2003 | Rosselot | 345/717 |
| 2003/0169930 A1 | 9/2003 | Shyu | |
| 2004/0010548 A1 | 1/2004 | Hamilton et al. | 709/204 |
| 2004/0044789 A1 * | 3/2004 | Angel et al. | 709/238 |
| 2004/0105395 A1 | 6/2004 | Friedrich et al. | 709/204 |
| 2004/0141605 A1 | 7/2004 | Chen et al. | 379/202 |
| 2004/0161080 A1 | 8/2004 | Digate et al. | 379/88.17 |
| 2004/0246332 A1 | 12/2004 | Crouch | |
| 2005/0007446 A1 | 1/2005 | Schrader et al. | |
| 2005/0034079 A1 | 2/2005 | Gunasekar et al. | 715/700 |
| 2005/0259145 A1 | 11/2005 | Schrader et al. | |
| 2006/0045253 A1 | 3/2006 | Bieselin et al. | 379/202.01 |
| 2006/0171337 A1 | 8/2006 | Shaffer et al. | 370/261 |
| 2007/0067387 A1 | 3/2007 | Jain et al. | |
| 2007/0121859 A1 | 5/2007 | Smelyansky et al. | |
| 2007/0133436 A1 | 6/2007 | Provino et al. | |
| 2007/0133438 A1 | 6/2007 | Shaffer et al. | 370/260 |
| 2008/0084984 A1 | 4/2008 | Levy et al. | 379/202 |
| 2008/0104171 A1 | 5/2008 | Berberian et al. | |
| 2009/0185556 A1 | 7/2009 | Kamenetsky et al. | |

OTHER PUBLICATIONS

Shaffer et al., U.S. Appl. No. 10/754,963, filed Jan. 8, 2004, *Method and System for Managing Conference Resources* patent application.

Shaffer et al., U.S. Appl. No. 10/754,963, filed Jan. 8, 2004, *Method and System for Managing Conference Resources*, communication from the Patent and Trademark Office mailed May 14, 2008.

Shaffer et al., U.S. Appl. No. 10/754,963, filed Jan. 8, 2004, *Method and System for Managing Conference Resources*, communication from the Patent and Trademark Office mailed Oct. 24, 2008.

Shaffer et al., U.S. Appl. No. 10/754,963, filed Jan. 8, 2004, *Method and System for Managing Conference Resources*, communication from the Patent and Trademark Office mailed Mar. 26, 2009.

Shaffer et al., U.S. Appl. No. 09/902,946, filed Jul. 11, 2001, *System and Method for Bandwidth and Conference Resource Reservation*, communication from the Patent and Trademark Office mailed Jan. 25, 2005.

Shaffer et al., U.S. Appl. No. 09/902,946, filed Jul. 11, 2001, *System and Method for Bandwidth and Conference Resource Reservation*, communication from the Patent and Trademark Office mailed Jul. 12, 2005.

Shaffer et al., U.S. Appl. No. 11/046,320, filed Jan. 28, 2005, *Method and System for Reserving Resources of a Multipoint Conference*, communication from the Patent and Trademark Office mailed Jan. 11, 2008.

Shaffer et al., U.S. Appl. No. 11/046,320, filed Jan. 28, 2005, *Method and System for Reserving Resources of a Multipoint Conference*, communication from the Patent and Trademark Office mailed Jun. 30, 2008.

Shaffer et al., U.S. Appl. No. 11/046,067, filed Jan. 28, 2005, *Method and System for Reserving Facility Resources for a Conference*, communication from the Patent and Trademark Office mailed Jan. 11, 2008.

Shaffer et al., U.S. Appl. No. 11/046,067, filed Jan. 28, 2005, *Method and System for Reserving Facility Resources for a Conference*, communication from the Patent and Trademark Office mailed Jul. 10, 2008.

Shaffer et al., U.S. Appl. No. 11/046,067, filed Jan. 28, 2005, *Method and System for Reserving Facility Resources for a Conference*, communication from the Patent and Trademark Office mailed Jan. 30, 2009.

Shaffer et al., U.S. Appl. No. 11/046,067, filed Jan. 28, 2005, *Method and System for Reserving Facility Resources for a Conference*, communication from the Patent and Trademark Office mailed Jul. 21, 2009.

PCT Intl. Search Report and Written Opinion (ISA/EPO) for PCT/US 2006/027779, Jan. 2, 2007.

Cisco Systems, Inc., "*Cisco Conference Connection*", Data Sheet, Internet Publication, http://www.cisco.com/warp/public/cc/pd/unco/cvco/prodlit/confr_ds.pdf, Jun. 2003.

Latitude Communications, "*Meetingplace Web 4.0, Secure, cost-effective web conferencing for enterprises*", © 2003 Latitude Communications, Inc., Internet Publication, http://www.latitude.com/pdfs/Web4.0.pdf, 2003.

Internet Engineering Task Force (IETF) Internet Draft. "*SIP for Presence,*" J. Rosenberg (Lucent Technologies, Bell Laboratories) and H. Schulzrinne (Columbia University), http://www.alternic.org/drafts/drafts-r-s/draft-rosenberg-sip-pip-00.txt, Nov. 13, 1998.

USPTO final Office Action for U.S. Appl. No. 10/754,963, in the name of Shmuel Shaffer, et al., 20 pages, Sep. 29, 2009.

USPTO Office Action for U.S. Appl. No. 10/754,963, in the name of Shmuel Shaffer, et al., 17 pages, Feb. 17, 2010.

USPTO final Office Action for U.S. Appl. No. 10/754,963, in the name of Shmuel Shaffer, et al., 10 pages, Aug. 16, 2010.

USPTO Office Action for U.S. Appl. No. 10/754,963, in the name of Shmuel Shaffer, et al., 12 pages, Jan. 20, 2011.

USPTO Office Action for U.S. Appl. No. 10/754,963, in the name of Shmuel Shaffer, et al., 15 pages, Jul. 6, 2011.

USPTO Office Action for U.S. Appl. No. 10/754,963, in the name of Shmuel Shaffer, et al., 13 pages, Dec. 6, 2011.

USPTO Office Action for U.S. Appl. No. 11/046,067, in the name of Shmuel Shaffer, et al., 13 pages, Jan. 26, 2010.

USPTO final Office Action for U.S. Appl. No. 11/046,067, in the name of Shmuel Shaffer, et al., 10 pages, Jul. 19, 2010.

USPTO Office Action for U.S. Appl. No. 11/046,067, in the name of Shmuel Shaffer, et al., 9 pages, Oct. 28, 2010.

USPTO final Office Action for U.S. Appl. No. 11/046,067, in the name of Shmuel Shaffer, et al., 11 pages, Apr. 13, 2011.

USPTO Office Action for U.S. Appl. No. 11/305,522, in the name of Shmuel Shaffer, et al., 30 pages, Jan. 4, 2010.

USPTO Office Action for U.S. Appl. No. 11/305,522, in the name of Shmuel Shaffer, et al., 18 pages, Jul. 9, 2010.

USPTO final Office Action for U.S. Appl. No. 11/305,522, in the name of Shmuel Shaffer, et al., 19 pages, Dec. 2, 2010.

USPTO Office Action for U.S. Appl. No. 11/305,522, in the name of Shmuel Shaffer, et al., 22 pages, May 25, 2011.

USPTO final Office Action for U.S. Appl. No. 11/305,522, in the name of Shmuel Shaffer, et al., 10 pages, Nov. 18, 2011.

USPTO Office Action for U.S. Appl. No. 11/305,522 in the name of Shmuel Shaffer, et al. 34 pages, Jul. 2, 2013.

* cited by examiner

SWAPPING BANDWIDTH RESERVATIONS

TECHNICAL FIELD OF THE INVENTION

The present invention relates generally to network communications and, more particularly, to swapping bandwidth reservations.

BACKGROUND OF THE INVENTION

Devices that facilitate network communications often have limited resources, e.g. bandwidth. However, in certain communications, a minimum quality of service (QoS) is desirable or necessary. These communications may require a particular amount of the limited resources available in network devices.

SUMMARY

In accordance with the present invention, techniques for swapping bandwidth reservations are provided. According to particular embodiments, these techniques describe a mechanism for swapping the assignment of a bandwidth reservation from one communication session to another communication session.

According to a particular embodiment, a method of swapping a bandwidth reservation comprises requesting a bandwidth reservation for a first communication session between a first endpoint and a second endpoint. The first communication session is routed through a first gateway and a second gateway. Both the first endpoint and the first gateway are located in a first network, and both the second endpoint and the second gateway are located in a second network. Session information indicating that the bandwidth reservation corresponds to the first communication session is stored. A request for a second communication session between the first endpoint and a third endpoint is received. The third endpoint is located in the second network, and the second communication session routed through the first gateway and the second gateway. It is determined that the second communication session can use the bandwidth reservation corresponding to the first communication session while the first communication session is in progress. The session information is modified to indicate that the bandwidth reservation corresponds to the second communication session. A swap of the bandwidth reservation from the first communication session to the second communication session is requested.

Embodiments of the invention provide various technical advantages. For example, these techniques may use the limited resources (e.g., bandwidth) of network devices more efficiently, thereby allowing each network device to handle increased traffic. In some embodiments, available bandwidth is deallocated from certain inactive communication sessions. Some endpoints allow more than one communication session to be in progress at any given time; however, these endpoints may only allow one communication session to be active at a time. Rather than allocating bandwidth to each communication session, some embodiments allow for bandwidth to be allocated only to the active communication session when possible. Also, in particular embodiments, an endpoint need not facilitate bandwidth reservations itself. The agent that makes and swaps bandwidth reservations may be located at the endpoint or at another location in the network.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
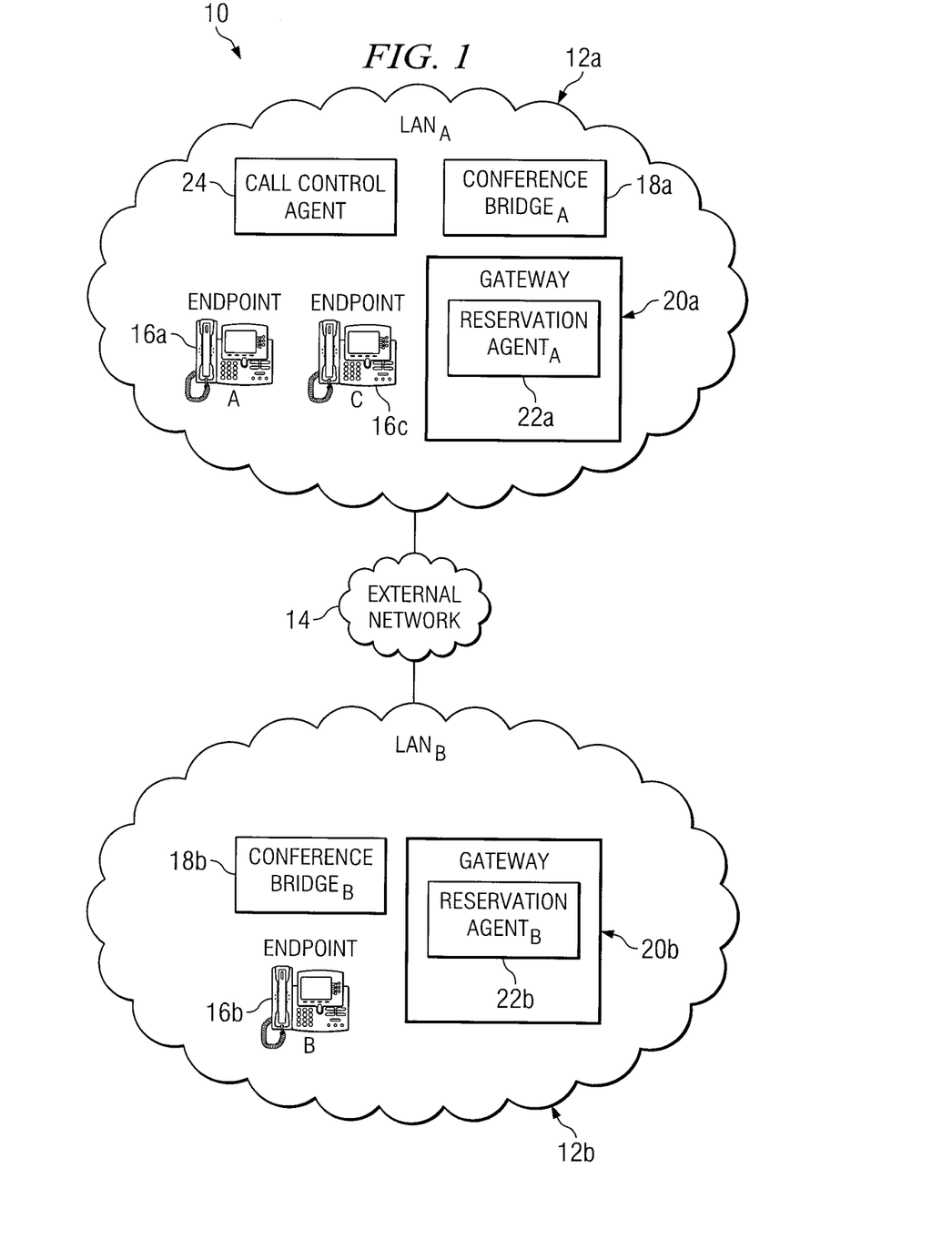
FIG. 1 illustrates a communication system with elements capable of swapping bandwidth reservations.

FIG. 1 illustrates a communication system, indicated generally at 10, that includes elements capable of swapping bandwidth reservations. As illustrated, system 10 includes local area networks 12 and an external network 14, which may interconnect using any suitable techniques or protocols. In general, elements within system 10 may interoperate to swap the assignment of a bandwidth reservation from one communication session to another communication session.

As illustrated, system 10 includes local area network 12a and local area network 12b. Local area networks 12 represent any suitable collection of hardware, software, and controlling logic to interconnect elements coupled to local area networks 12. Generally, local area networks 12 provide an infrastructure to support communications between attached devices. In particular embodiments, local area networks 12 interconnect elements in such a way that certain resources, e.g. bandwidth, do not significantly affect or limit the operations of local area networks 12. While illustrated as local area networks (LANs), local area networks 12 can include one or multiple networks of any suitable type. Moreover, while local area network 12a and local area network 12b are illustrated and described as having a particular configuration and arrangement of elements, it is understood that each of local area networks 12 can include any suitable devices arranged in any appropriate configuration. In the illustrated embodiment, local area network 12a includes endpoint 16a, endpoint 16c, conference bridge 18a, gateway 20a, reservation agent 22a, and call control agent 24, and local area network 12b includes endpoint 16b, conference bridge 18b, gateway 20b, and reservation agent 22b.

Endpoints 16 represent communication devices capable of transmitting and/or receiving communications sent through local area networks 12 and/or external network 14. In particular embodiments, endpoints 16 may be telephones, video phones, computers, personal digital assistants (PDAs), cell phone, or any other appropriate device for communicating through a network. In certain embodiments, a user may employ one of endpoints 16 in local area network 12a to contact another user on a different endpoint 16 in local area network 12b. In some embodiments, endpoints 16 are capable of receiving multiple streams, for example, a voice stream, a data stream, and a video stream. However, it should be understood that streams may include any suitable information and may be logically divided; for example, a data stream may carry voice and video streams. While local area network 12a is illustrated and described as having two endpoints 16, it is understood that local area network 12a can have any number of endpoints 16.

Conference bridge 18a represents any suitable device or collection of devices for facilitating a communication session between multiple endpoints 16. In some embodiments, conference bridge 18a facilitates a communication session between three or more endpoints 16 by selecting and combining individual media streams sent from endpoints 16 into a combined media stream that contains multiple individual media streams. For example, if endpoint 16a, endpoint 16c, and endpoint 16b participate in a conference, then conference bridge 18a may be interposed in the media paths. During the conference, conference bridge 18a may receive media streams from both endpoint 16a and endpoint 16c and combine these individual media streams into a combined media stream for transmission to endpoint 16b. Similarly, conference bridge 18a may receive and combine media streams from endpoint 16b and endpoint 16c for delivery to endpoint 16a and may receive and combine media streams from endpoint 16a and endpoint 16b for delivery to endpoint 16c. Thus, in particular embodiments, all three endpoints 16 may receive the media streams from the other two endpoints 16 through conference bridge 18 in a combined media stream. However, while described in this simple example as each endpoint 16 receiving media from all other participants, conference bridge 18 may use any suitable algorithms for selecting and mixing media for delivery to endpoints 16 participating in a conference. In certain embodiments, endpoints 16 receive multiple combined media streams from conference bridge 18 with one combined media stream per media type, so that, for example, all voice streams are combined into a single combined stream. While local area network 12a is shown as including one conference bridge 18a, local area network 12a may include one, many, or no conference bridges 18.

Gateway 20a is responsible for facilitating network communications between local area network 12a and devices and/or networks outside of local area network 12a. In the illustrated embodiment, gateway 20a interfaces local area network 12a with external network 14. In particular embodiments, gateway 20a receives packets from endpoints 16, conference bridge 18a, and call control agent 24 and transmits these packets through external network 14 to local area network 12b. In some embodiments, gateway 20a provides an interface for another network that uses different protocols. Gateway 20a may contain devices such as protocol translators, impedance matching devices, rate converters, fault isolators, and signal translators. In the illustrated embodiment, gateway 20a includes reservation agent 22a. While logically depicted as only containing reservation agent 22a, gateway 20a may include any appropriate components, elements, or devices to provide any suitable functionality to facilitate network communications between local area network 12 and other devices and/or networks.

Reservation agent 22a reserves resources to provide quality of service (QoS) for various communication sessions. In particular embodiments, reservation agent 22a communicates with reservation agent 22b to reserve bandwidth for a particular communication session passing between gateway 20a and gateway 20b. Reservation agent 22a may send messages to reservation agent 22b using the same path as the communication session will use, allowing reservation agent 22a to reserve resources in the same devices that facilitate the communication session. In some embodiments, reservation agent 22a is responsible for reserving resources for media streams transmitted through other devices. Thus, reservation agent 22a may send messages through external network 14 requesting resource reservations from network devices, not illustrated, located in external network 14 that are capable of reserving resources. In some embodiments, reservation agents 22 are RSVP (Resource ReSeRvation Protocol) agents. RSVP is a resource reservation setup protocol that may be used to transmit quality of service (QoS) requests to devices in the network and to request, establish, and maintain resource reservations. However, system 10 contemplates reservation agents 22 supporting any suitable protocols. While depicted and described as being located in gateways 20, it is understood that reservation agents 22 can be located in any suitable location. For example, reservation agents 22 may be located at endpoints 16 or within call control agent 24.

Call control agent 24 represents one or more devices, including appropriate controlling logic, capable of managing communication sessions between network devices, such as voice calls between endpoints 16. Call control agent 24 maintains information and handles signaling to support these communications. For example, call control agent 24 may maintain a database of active calls, calls on hold, ports assigned to calls, and bandwidth reserved between reservation agents 22. Call control agent 24 may also maintain session information containing information regarding communication sessions that are in progress. These in progress communication sessions may be active or on hold. Call control agent 24 is also operable to request bandwidth reservations. During operation, call control agent 24 may receive call setup requests from endpoints 16. Call control agent 24 may then determine whether endpoints 16 desire and/or require a particular quality of service or amount of a resource, e.g. bandwidth, for the communication session. If call control agent 24 determines that a communication session requested by one of endpoints 16 requires a particular or minimum amount of bandwidth, call control agent 24 may contact reservation agent 22a and instruct reservation agent 22a to reserve bandwidth for the communication session.

Call control agent 24 is further operable to determine that bandwidth reservations can be swapped between communication sessions. Call control agent 24 may receive a call setup request from one of endpoints 16 and determine that endpoint 16 requires a particular amount of bandwidth for the communication session. Call control agent 24 may determine that the bandwidth may be swapped from an inactive communication session, and call control agent 24 may instruct reservation agent 22 to swap the bandwidth reservation. In some embodiments, the bandwidth reservation may be swapped from a communication session in progress between one of endpoints 16 and another one of endpoints 16 or one of conference bridges 18. In particular embodiments, call control agent 24 performs other operations to manage communication sessions involving elements within local area networks 12 and potentially other networks. While depicted as one device, it is understood that call control agent 24 may be formed of any suitable components or devices and may be located at one or more physical locations.

While local area network 12a is depicted as having a particular configuration of elements, it should be noted that this is a logical depiction and the components and functionality of local area network 12a may be located at one or more physical locations. The operations performed by the devices in local area network 12a may be removed, modified, or reordered in any appropriate manner. Also, the functionality of call control agent 24 may be provided by any suitable collection and arrangement of components. The functions performed by the various components of local area network 12a may be accomplished by any suitable devices to facilitate swapping of bandwidth reservations.

In the illustrated embodiment, external network 14 connects local area network 12a to local area network 12b. In certain embodiments, external network 14 may include one or multiple networks such as telecommunications networks, satellite networks, cable networks, local area networks (LANs), wide area networks (WANs), the Internet, and/or any other appropriate networks. External network 14 may include any suitable collection and arrangement of devices and components. In some embodiments, external network 14 provides only limited bandwidth for communications sent through external network 14. In particular embodiments, external network 14 includes network devices that are capable of reserving communication resources. These network devices may communicate with reservation agents 22 and assist in the bandwidth reservation requests between different reservation agents 22.

As illustrated, system 10 also includes local area network 12b. Call control agent 24 in local area network 12a may also manage communication sessions between or from network devices located in local area network 12b. Local area network 12b includes endpoint 16b, conference bridge 18b, gateway 20b, and reservation agent 22b. In particular embodiments, endpoint 16b is substantially similar to endpoints 16 described with respect to local area network 12a. Conference bridge 18b likewise may be similar to conference bridge 18a described with respect to local area network 12a. In the illustrated embodiment, gateway 20b facilitates communication sessions between local area network 12b and external network 14 and includes reservation agent 22b. Reservation agent 22b may communicate with reservation agent 22a to facilitate bandwidth reservations between devices in local area network 12a and devices in local area network 12b. In some embodiments, reservation agent 22b is found in a different location in local area network 12b. For example, reservation agent 22b may be incorporated into endpoint 16b. While local area network 12b is shown as containing a particular configuration and arrangement of elements, it is understood that local area network 12b may include any suitable devices for swapping bandwidth reservations.

In operation, system 10 may reserve bandwidth for a communication session and may swap a bandwidth reservation from one communication session to another communication session. For example, endpoint 16a desires a communication session with endpoint 16b. Endpoint 16a sends a request to call control agent 24 for a connection with endpoint 16b. In particular embodiments, endpoint 16a may indicate the type of call, any quality of service requirements, and a bandwidth reservation request. Call control agent 24 receives the request from endpoint 16a and determines the required bandwidth reservation, if any. Call control agent 24 may instruct reservation agent 22a to reserve bandwidth and identify particular ports for the communication session. In other embodiments, call control agent 24 makes the bandwidth reservations in the appropriate network devices. Reservation agent 22a receives the instruction from call control agent 24 and may send a path message to reservation agent 22b specifying the ports that reservation agent 22a (or gateway 20a) has designated for the communication session. The path message may include any appropriate information, including, for example, the identity of endpoints 16a, 16b of the communication session. In some embodiments, call control agent 24 determines port designations and instructs both reservation agent 22a and reservation agent 22b to make the necessary reservations. Upon receiving a path message from reservation agent 22a, reservation agent 22b similarly identifies particular ports for the communication session and sends a reservation request message to reservation agent 22a. In the illustrated embodiment, reservation agent 22b sends the reservation request message through external network 14. In particular embodiments, network devices in external network 14 receive the reservation request message and determine whether or not to allocate the requested amount of bandwidth to the communication session. If a network device can allocate the requested bandwidth, the network device reserves the bandwidth for that communication session and forwards the reservation request message to the next network device, which may be reservation agent 22a. If a network device cannot allocate sufficient bandwidth to the communication session, then the network device returns an error message to reservation agent 22b. Devices receiving the error message on its way back to reservation agent 22b may remove the bandwidth reservation previously created and forward the error message to reservation agent 22b. If reservation agent 22a receives the reservation request message, then reservation agent 22a may record the bandwidth reservation and transmit a reservation confirmation message to call control agent 24, indicating that the requested bandwidth has been allocated to the communication session.

Next, call control agent 24 may direct the establishment of media path(s) between the calling party, endpoint 16a in this example, and the called party, endpoint 16b. In particular embodiments, a media path containing information sent from endpoint 16a to endpoint 16b is routed from endpoint 16a through gateway 20a through external network 14 through gateway 20b to endpoint 16b. In some embodiments, the resource reservation must be individually requested for each direction, and a similar procedure may be used to reserve bandwidth for the communication session from endpoint 16b to endpoint 16a.

Once the communication session from endpoint 16a to endpoint 16b is in progress, another one of endpoints 16, for example endpoint 16c, may send a call request to communicate with endpoint 16b. In some embodiments, endpoint 16b receives a notification that endpoint 16c has requested a communication session with endpoint 16b. In response, endpoint 16b may opt to answer the communication session from endpoint 16c and put the communication session with endpoint 16a on hold, or endpoint 16b may ignore the communication session from endpoint 16c. If endpoint 16b chooses to answer the communication session from endpoint 16c, endpoint 16b renders the communication session between endpoint 16b and endpoint 16a inactive and initiates the communication session between endpoint 16c and endpoint 16b. In some embodiments, endpoint 16b renders one communication session inactive and activates another communication session by sending messages to call control agent 24, who directs the activation and deactivation of communication sessions. In other embodiments, call control agent 24 detects that one communication session has gone inactive while another communication session was activated and responds appropriately.

Call control agent 24 may direct reservation agent 22a and reservation agent 22b to swap a bandwidth reservation assignment from the communication session between endpoint 16a and endpoint 16b to the communication session between endpoint 16c and endpoint 16b. Call control agent 24 may then direct the establishment of media path(s) between endpoint 16c and endpoint 16b using the bandwidth reservation originally used for the communication session between endpoint 16a and endpoint 16b. The communication session between endpoint 16c and endpoint 16b progresses, and, at some point, endpoint 16c or endpoint 16b may terminate the communication session. When that happens, endpoint 16b may choose to reactivate the communication session with endpoint 16a. So, when one of the endpoints 16b,c terminates the communication session between endpoint 16c and endpoint 16b, call control agent 24 may determine that the bandwidth reservation should be re-swapped and may re-assign the bandwidth reservation to the communication session between endpoint 16a and endpoint 16b. In some embodiments, call control agent 24 directs reservation agent 22a and reservation agent 22b to swap the assignment of the bandwidth reservation from the completed C-B communication session to the reactivated A-B communication session. Endpoint 16b may then re-activate the communication session between endpoint 16a and endpoint 16b and use the bandwidth that was originally reserved for that call. While an example communication session has been described as including endpoints 16, it should be understood that conference bridges 18 may be included in swapping bandwidth reservations in a similar manner. In some embodiments, endpoints 16 may have three or more communication sessions in progress (e.g. one active and two on hold) when call control agent 24 directs the corresponding reservation agents 22 to swap a bandwidth reservation.

Particular embodiments of a system for swapping bandwidth reservations have been described and are not intended to be all inclusive. While system 10 is depicted as containing a certain configuration and arrangement of elements, it should be noted that this is a logical depiction and the components and functionality of system 10 may be combined, separated, and distributed as appropriate both logically and physically. Also the functionality of system 10 may be provided by any suitable collection and arrangement of components. The functions performed by the various components of call control agent 24 and reservation agents 22 may be accomplished by any suitable devices located in any appropriate locations to swap the assignment of bandwidth reservations.

Figure 2:
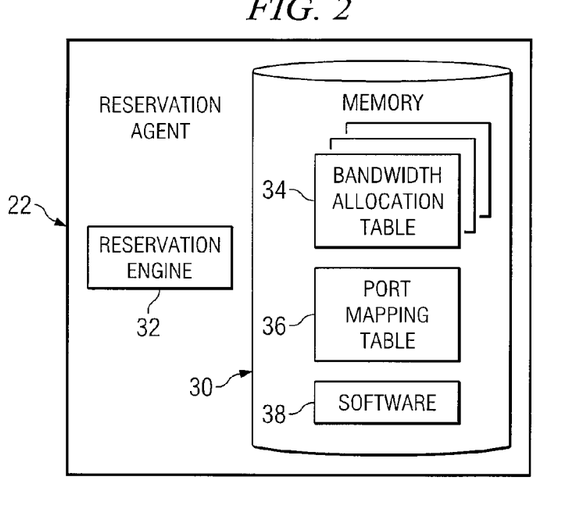
FIG. 2 illustrates a reservation agent that may reserve bandwidth and swap bandwidth reservations.

FIG. 2 illustrates one of reservation agents 22 which is operable to reserve bandwidth and swap bandwidth reservations. As illustrated, reservation agent 22 includes memory 30 and reservation engine 32. Memory 30 is illustrated as including bandwidth allocation table 34, port mapping table 36, and software 38. While information located in memory 30 is graphically depicted as individual files, folders, or other storage elements, it is understood that the information described can be stored in any appropriate manner. Thus, memory 30 represents any suitable hardware including appropriate controlling logic for storing the information required by reservation agent 22.

Bandwidth allocation table 34 stores information regarding current bandwidth reservations and additional bandwidth available for future bandwidth reservation requests. In some embodiments, reservation agent 22 only stores current bandwidth reservations and available bandwidth of reservation agent 22 in bandwidth allocation table 34. However, in other embodiments, reservation agent 22 stores information regarding the current bandwidth reservations and available bandwidth of various devices, including other reservation agents 22.

As illustrated, memory 30 includes port mapping table 36. Port mapping table 36 associates the ports of reservation agent 22 with communication sessions that are in progress. In some embodiments, port mapping table 36 may indicate that information received from a given port is associated with a particular communication session. Port mapping table 36 may also indicate the appropriate outbound port for individual communication sessions in progress so that the necessary quality of service (QoS) is provided. In some embodiments, reservation agent 22 has particular ports associated with frames sent and received from external network 14 and other ports associated with frames sent and received from devices within local area network 12 associated with reservation agent 22. Port mapping table 36 may indicate the appropriate association between ports associated with external network 14 and ports associated with local area network 12. In other embodiments, reservation agent 22 maintains port mapping table 36 to indicate which ports are associated with a media stream received by one of endpoints 16 and which ports are associated with the media stream sent by the one of endpoints 16.

Memory 30 may also include software 38. Software 38 represents any suitable programs, software, hardware, logic, or circuitry capable when executed to control the operation of various elements in reservation agent 22. Software 38 may be included in another part of reservation agent 22 outside of memory 30. Also, software 38 may or may not be included in memory 30 or reservation agent 22.

In general, reservation engine 32 manages the operation of reservation agent 22. Reservation engine 32 may process messages received by reservation agent 22 from call control agent 24. Call control agent 24 may send these messages to instruct reservation agent 22 to reserve bandwidth for a particular communication session. In particular embodiments, reservation engine 32 accesses bandwidth allocation table 34 to determine whether or not sufficient bandwidth is available to satisfy the reservation request received from call control agent 24. After accessing bandwidth allocation table 34, reservation engine 32 may determine whether to accept the reservation request or to send an error message to call control agent 24 indicating that sufficient bandwidth is unavailable. If reservation engine 32 determines that sufficient bandwidth is available for the reservation, reservation engine 32 may store information regarding the bandwidth reservation in bandwidth allocation table 34. In some embodiments, reservation engine 32 transmits a reservation request message to another reservation agent 22 or other network device capable of processing or transmitting reservation requests.

Particular embodiments of a system for swapping bandwidth reservations have been described and are not intended to be all inclusive. While reservation agent 22 is depicted as containing a certain configuration and arrangement of elements, it is understood that this is a logical depiction and the components and functionality of reservation agent 22 may be combined, separated and distributed as appropriate, both logically and physically. Also the functionality of reservation agent 22 may be provided by any suitable collection and arrangement of components. The functions performed by the various components of reservation agent 22 may be accomplished by any suitable devices to facilitate swapping of bandwidth reservations.

Figure 3:
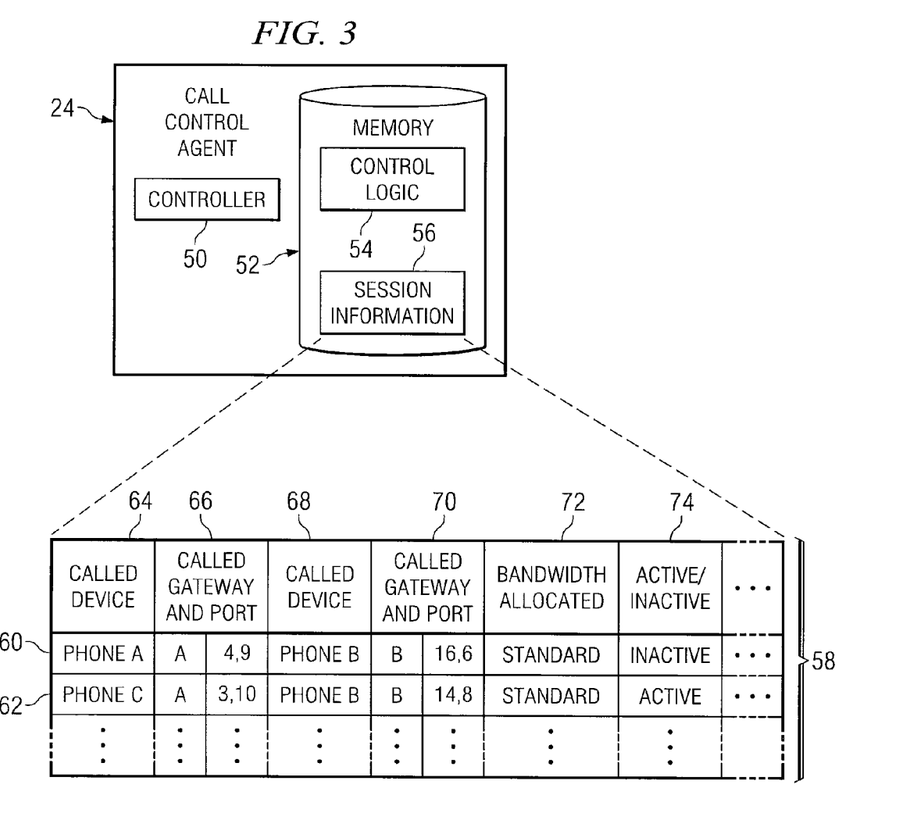
FIG. 3 illustrates a call control agent able to direct bandwidth reservations and bandwidth reservation swaps.

FIG. 3 illustrates a call control agent 24 able to direct bandwidth reservations and bandwidth reservation swaps. As illustrated, call control agent 24 includes a controller 50 and memory 52. In general, controller 50 manages the operation of call control agent 24. In particular embodiments, controller 50 may access memory 52 to store additional information and to retrieve information previously stored regarding communication sessions in progress between endpoints 16, conference bridges 18, and/or any other appropriate devices. In particular embodiments, controller 50 is operable to determine when a bandwidth reservation assignment can be swapped from one communication session to another communication session. In certain embodiments, controller 50 determines when bandwidth reservations should be made, when bandwidth reservations should be swapped, and when bandwidth reservations should be released.

Memory 52 is illustrated as including control logic 54 and session information 56. While information located in memory 30 is graphically depicted as individual files, folders, or other storage elements, it is understood that the information described can be stored in any appropriate manner. Thus, memory 30 represents any suitable hardware, including appropriate controlling logic, for storing information required by call manger 24. Control logic 54 includes any suitable program, software, hardware, logic or circuitry and is capable when executed to control the operation of various elements in call control agent 24 and to perform any other functions required by call control agent 24. Control logic 54 may or may not be included in memory 52 or call control agent 24.

Session information 56 provides information regarding communication sessions in progress between devices in local area networks 12, external network 14, and/or any other appropriate networks. Session information 56 may store information regarding communication sessions between endpoints 16, conference bridges 18, and/or any other suitable devices. The information stored by session information 56 is logically depicted in table 58, which includes six columns and two rows. It is understood that the information represented by table 58 is merely illustrative of information stored by session information 56. In some embodiments, session information 56 includes additional information required by call control agent 24, causing table 58 to contain additional rows or additional columns to demonstrate any appropriate information. In particular embodiments, session information 56 contains some or none of the information depicted by table 58.

As illustrated, table 58 includes rows of information corresponding to different communication sessions that are in progress and managed by call control agent 24. Row 60 corresponds to a communication session from endpoint 16a, "Phone A," to endpoint 16b, "Phone B." Row 62 corresponds to a communication session from endpoint 16c, "Phone C," to endpoint 16b, "Phone B." Table 58 also includes six columns: calling device 64, calling gateway and port 66, called device 68, called gateway and port 70, bandwidth allocated 72, and active/inactive 74.

Calling device 64 indicates the endpoint 16 or other device that initiated the communication session. Calling gateway and port 66 stores the identification of the gateway 20 corresponding to calling device 64 and the ports on that gateway associated with the communication session. The gateway 20 corresponding to calling device 64 is the gateway 20 through which the communication session is routed on the calling device side. Called device 68 stores the endpoint 16 or other device to whom the communication session was directed. In many embodiments, a two-way communication session is established between the calling device 64 and the called device 68, and the designation of which endpoint 16 or device is the calling device 64 versus the called device 68 may be immaterial. Called gateway and port 70 similarly maintains the identification of the gateway 20 corresponding to called device 68 and the ports on that gateway associated with the communication session.

Bandwidth allocated 72 stores the bandwidth reservation requested or desired for the communication session. In some embodiments, bandwidth allocated 72 indicates that a communication session requires only the standard amount of bandwidth, a greater amount of bandwidth, or less bandwidth than the standard communication. In other embodiments, bandwidth allocated 72 is represented by a particular number representing the precise bandwidth required by and allocated to the communication session. In some embodiments, bandwidth allocated 72 simply indicates the type of communication session. Bandwidth allocated 72 may also be represented in any other suitable manner. Active/inactive 74 stores the current status of the call, which, in the illustrated embodiment is represented by either "active" or "inactive." As shown in row 60, the communication session between Phone A and Phone B is inactive, while, as shown in row 62, the communication session between Phone C and Phone B is active. In some embodiments, active/inactive 74 can contain any suitable information.

While session information 56 is graphically represented by table 58, it is understood that table 58 is merely a logical depiction of information that may be maintained by session information 56. In certain embodiments, session information 56 maintains additional information regarding communication sessions in progress, past communication sessions, other functions of system 10, and any other suitable information. In particular embodiments, session information 56 is stored in one or more tables, databases, files, hashes, and/or any other appropriate storage elements.

Particular embodiments of a system for swapping bandwidth reservations have been described and are not intended to be all inclusive. While call control agent 24 is depicted as containing a certain configuration and arrangement of elements, it should be understood that this is a logical depiction and the components and functionality of call control agent 24 may be combined, separated and distributed as appropriate both logically and physically. Also the functionality of call control agent 24 may be provided by any suitable collection and arrangement of components. The functions performed by the various components of call control agent 24 may be accomplished by any suitable devices to make and swap bandwidth reservations.

Figure 4:
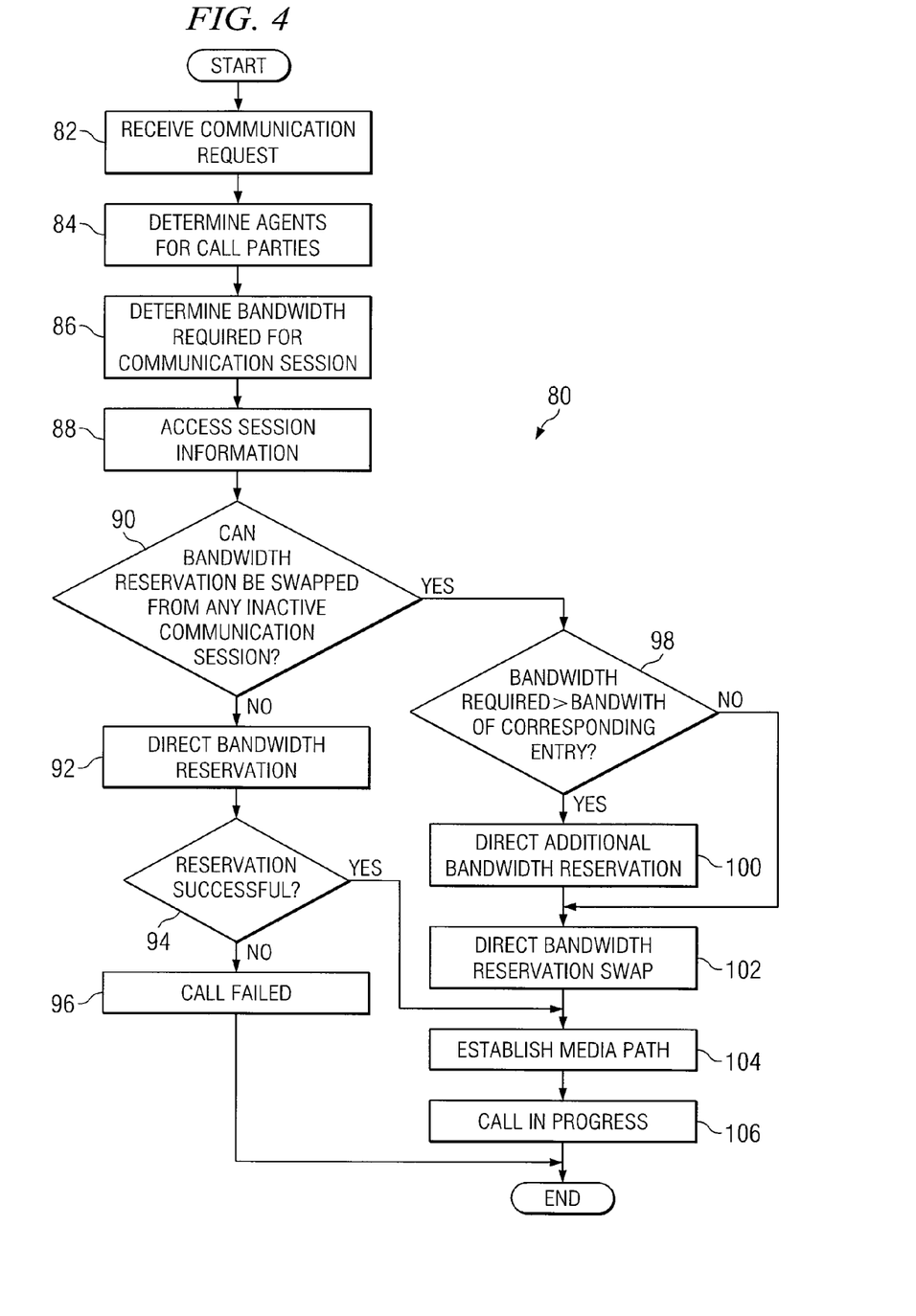
FIG. 4 is a flowchart illustrating a method by which a call control agent may direct bandwidth reservations and bandwidth reservation swaps.

FIG. 4 is a flowchart illustrating a method 80 by which call control agent 24 may direct reservation agents 22 to make and swap bandwidth reservations. In step 82, call control agent 24 receives a connection request from one of endpoints 16. Call control agent 24 determines the appropriate reservation agents 22 corresponding to the call parties in step 84. Call parties may be endpoints 16, conference bridges 18, or any other suitable devices. In step 86, call control agent 24 determines the bandwidth required for the communication session. In some embodiments, call control agent 24 may determine that no bandwidth reservation is required for the communication session. Call control agent 24 then accesses session information in step 88. The session information accessed by call control agent 24 may be similar or identical to table 58 or session information 56. In general, session information provides information to call control agent 24 regarding communication sessions that are in progress. In some embodiments, session information stores information regarding active calls, inactive calls, and other information regarding communication sessions required by call control agent 24.

In step 90, call control agent 24 determines whether a bandwidth reservation can be swapped from one communication session to another communication session by determining whether the former is inactive. In particular embodiments, call control agent 24 determines that a bandwidth reservation can be swapped from an inactive communication session when either the called or calling party of the inactive communication session is a call party for the requested communication session. In other embodiments, call control agent 24 may determine that the bandwidth reservation may be swapped from an inactive connection for any of a variety of other reasons. In particular embodiments, call control agent 24 determines whether a bandwidth reservation can be swapped from one communication session to another communication session by determining the relative priority of the communication sessions. If call control agent 24 determines in step 90 that a bandwidth reservation cannot be swapped, then method 80 proceeds to step 92, where call control agent 24 directs the making of a new bandwidth reservation. In some embodiments, call control agent 24 instructs one of reservation agents 22 to send a reservation request message in order to reserve bandwidth for the communication session. At step 94, call control agent 24 determines whether the bandwidth reservation was successful. If the reservation was not successful, method 80 proceeds to step 96, where the communication session fails and the method is complete. However, if, in step 94, the bandwidth reservation was made successfully, method 80 proceeds to step 104, discussed more fully below.

If, in step 90, call control agent 24 determined that the bandwidth reservation could be swapped from an inactive communication session, then method 80 proceeds to step 98, where call control agent 24 determines whether the bandwidth currently requested is more than the bandwidth allocated to the inactive communication session. If the bandwidth requested is more than the bandwidth allocated, then method 80 proceeds to step 100. Call control agent 24 directs an additional bandwidth reservation in step 100, and method 80 proceeds to step 102. In some embodiments, call control agent 24 instructs reservation agents 22 to send a bandwidth reservation request in order to reserve the additional bandwidth required for the communication session. In other embodiments, call control agent 24 combines bandwidth reservations from multiple inactive communication sessions. On the other hand, if, in step 98, call control agent 24 determined that the bandwidth required was not greater than the available bandwidth, then method 80 simply proceeds to step 102.

Call control agent 24 directs the bandwidth reservation swap in step 102. In some embodiments, call control agent 24 instructs reservation agents 22 to swap the assignment of the bandwidth reservation from the inactive communication session to the requested communication session. In particular embodiments, reservation agents 22 swap a bandwidth reservation by modifying a corresponding entry in bandwidth allocation table 34. One of reservation agents 22 may modify an entry in bandwidth allocation table 34 by indicating that the bandwidth assigned to the inactive communication session has been swapped to the active communication session. In some embodiments, reservation agents 22 may modify the port designations corresponding to the bandwidth reservation stored in bandwidth allocation table 34. Call manger 24 and/or reservation agents 22 may swap a bandwidth reservation in any suitable manner.

In step 104, call control agent 24 establishes a media path between the call parties. In particular embodiments, the established media path indicates that the communication session is in progress and active. The media path may be routed through gateways 20 and network devices in external network 14 that stored a bandwidth reservation for the communication session. After the communication session is in progress at step 106, method 80 ends.

The method described with respect to FIG. 4 is merely illustrative and it is understood that the manner of operation and devices indicated as performing the operations may be modified in any appropriate manner. While the method describes particular steps performed in a specific order by identified components or elements, it should be understood that system 10 contemplates any suitable collection and arrangement of elements performing some, all, or none of these steps in any operable order.

Figure 5:
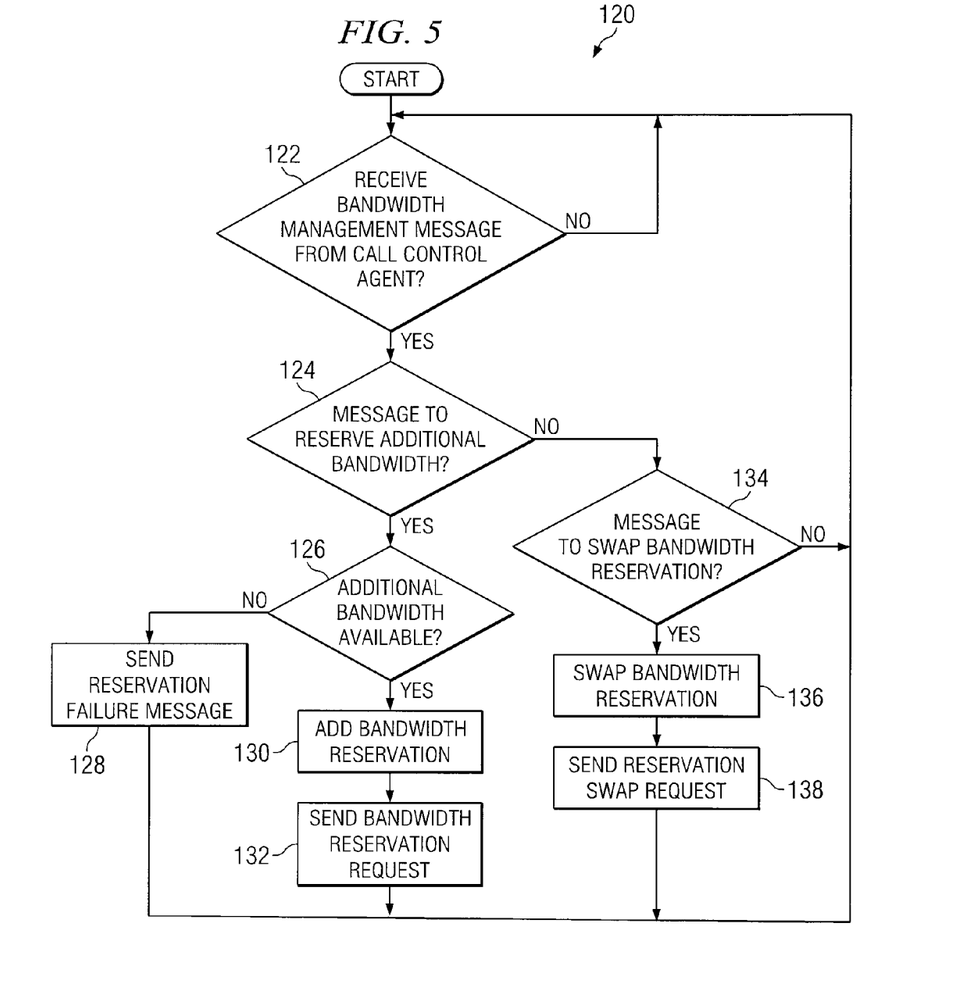
FIG. 5 is a flowchart illustrating a method by which a reservation agent may make and swap bandwidth reservations.

FIG. 5 is a flowchart illustrating a method 120 by which reservation agent 22 may respond to directions given by call control agent 24 in order to make and swap bandwidth reservations. At step 122, reservation agent 22 determines whether it has received a bandwidth management message from call control agent 24. If not, method 120 returns to step 122. When reservation agent 22 receives a bandwidth management message, method 120 proceeds to step 124.

In step 124, reservation agent 22 determines whether the received message instructs reservation agent 22 to reserve additional bandwidth. If the message indicates that reservation agent 22 should reserve additional bandwidth, reservation agent 22, determines whether the additional bandwidth requested by call control agent 24 is available at step 126. If that additional bandwidth is not available, then reservation agent 22 sends a reservation failure message to call control agent 24, and method 120 returns to step 122. However, if reservation agent 22 determines that additional bandwidth is available, reservation agent 22 reserves the requested bandwidth and stores that reservation at step 130. In some embodiments, reservation agent 22 stores the bandwidth reservation in bandwidth allocation table 34. In step 132, reservation agent 22 sends a bandwidth reservation request. In some embodiments, reservation agent 22 transmits the bandwidth reservation request to other network devices that may route the communication session through the network. For example, network devices may be located in external network 14, another local area network 12, and/or any other appropriate networks. Once reservation agent 22 sends a bandwidth reservation request, method 120 returns to step 122.

If, in step 124, reservation agent 22 determined that the message received from call control agent 24 was not an instruction to reserve additional bandwidth, then reservation agent determines whether the message directs reservation agent 22 to swap a bandwidth reservation, in step 134. If the received message is also not an instruction to swap a bandwidth reservation, then the received message is discarded and method 120 returns to step 122. However, if the message received is an instruction to swap a bandwidth reservation, reservation agent 22 swaps the bandwidth reservation in step 136. In some embodiments, reservation agent 22 may access bandwidth allocation table 34 and modify the entry corresponding to the bandwidth reservation to be swapped. Modifying the entry includes adding one or more entries, deleting one or more entries, and/or changing the information stored by one or more entries. In other embodiments, reservation agent 22 may swap the bandwidth reservation by any other appropriate method. In step 138 reservation agent 22 sends a reservation swap request. In some embodiments, reservation agent 22 transmits a swap request to the network devices through which the communication session was or will be routed, including, for example, other reservation agents 22. In particular embodiments, reservation agent 22 transmits the swap request to any network devices that are affected by the bandwidth reservation swap. For example, these devices may be located in external network 14, other local area networks 12, and/or any other appropriate locations. In particular embodiments, reservation agent 22 transmits a reservation swap request to other devices so that the bandwidth reservation swap can be accomplished at every device that stores the original bandwidth reservation.

The method described with respect to FIG. 5 is merely illustrative and it is understood that the manner of operation and devices indicated as performing the operations may be modified in any appropriate manner. While the method describes particular steps performed in a specific order, it should be understood that system 10 contemplates any suitable collection and arrangements of elements performing some, all or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method of swapping a bandwidth reservation comprising:
   receiving a request for a first communication session between a first end point in a first network and a second endpoint in a second network, the first communication session routed through a first gateway in the first network and a second gateway in the second network;
   in response to receiving a request for the first communication session, requesting a bandwidth reservation for the first communication session corresponding to the entire media path between the first end point in the first network and the second endpoint in the second network through the first gateway and the second gateway;
   prior to establishing the first communication session, receiving a confirmation of the requested bandwidth reservation, the confirmation corresponding to an indication that requested bandwidth has been reserved along the entire media path between the first endpoint in the first network and the second endpoint in the second network through the first gateway and the second gateway;
   storing session information indicating that the bandwidth reservation corresponds to the first communication session;
   receiving a request for a second communication session between the first endpoint and a third endpoint, the third endpoint located in the second network, the second communication session routed through the first gateway and the second gateway;
   determining that the second communication session can use the bandwidth reservation corresponding to the first communication session while the first communication session is in progress;
   modifying the session information to indicate that the bandwidth reservation corresponds to the second communication session; and
   requesting a swap of the bandwidth reservation from the first communication session to the second communication session.

2. The method of claim 1, further comprising the steps of:
   terminating the second communication;
   modifying the session information to indicate that the bandwidth reservation corresponds to the first communication; and
   requesting a swap of the bandwidth reservation from the second communication session to the first communication session.

3. The method of claim 1, wherein:
   the session information indicates a first port on the first gateway assigned to the first communication session and a second port on the first gateway assigned to the second communication session;
   the bandwidth reservation is associated with the first port when the bandwidth reservation corresponds to the first communication session; and
   modifying the session information comprises associating the bandwidth reservation with the second port.

4. The method of claim 1, further comprising:
   determining that the first communication session is inactive; and
   in response, requesting the swap of the bandwidth reservation from the first communication session to the second communication session.

5. The method of claim 1, further comprising:
   determining that additional bandwidth should be allocated to the second communication;
   requesting a reservation of additional bandwidth between the first gateway and the second gateway; and
   modifying the session information to indicate that both the bandwidth reservation and the additional bandwidth reserved correspond to the second communication.

6. The method of claim 1, wherein the bandwidth is reserved between the first gateway and the second gateway in a communication link connecting the first network and the second network, wherein the communication link has a limited amount of bandwidth.

7. The method of claim 1, wherein the first, second, and third endpoints are selected from: a conference bridge, a telephone, a video phone, a computer, a personal digital assistant, and a cell phone.

8. A device for swapping a bandwidth reservation comprising:
   session information stored in a memory, the session information indicating that a bandwidth reservation corresponds to a first communication session between a first endpoint and a second endpoint, the first communication session routed through a first gateway and a second gateway, wherein both the first endpoint and the first gateway are located in a first network and both the second endpoint and the second gateway are located in a second network; and
   a controller operable to receive a request for the first communication session, request, in response to receiving a request for the first communication session, the bandwidth reservation for the first communication session corresponding to the entire media path between the first end point in the first network and the second endpoint in the second network through the first gateway and the second gateway, receive, prior to establishing the first communication session, a confirmation of the requested bandwidth reservation corresponding to an indication that requested bandwidth has been reserved along the entire media path between the first endpoint in the first network and the second endpoint in the second network through the first gateway and the second gateway, and to receive a request for a second communication session between the first endpoint and a third endpoint, the third endpoint located in the second network, the second communication session routed through the first gateway and the second gateway; the controller further operable to determine that the second communication session can use the bandwidth reservation corresponding to the first communication session while the first communication session is in progress, to modify the session information to indicate that the bandwidth reservation corresponds to the second communication session, and to request a swap of the bandwidth reservation from the first communication session to the second communication session.

9. The device of claim 8, wherein the controller is further operable to:
- terminate the second communication;
- modify the session information to indicate that the bandwidth reservation corresponds to the first communication; and
- request a swap of the bandwidth reservation from the second communication session to the first communication session.

10. The device of claim 8, wherein:
- the session information indicates a first port on the first gateway assigned to the first communication session and a second port on the first gateway assigned to the second communication session;
- the bandwidth reservation is associated with the first port when the bandwidth reservation corresponds to the first communication session; and
- modifying the session information comprises associating the bandwidth reservation with the second port.

11. The device of claim 8, wherein the controller is further operable to:
- determine that the first communication session is inactive; and
- in response, request the swap of the bandwidth reservation from the first communication session to the second communication session.

12. The device of claim 8, wherein the controller is further operable to:
- determine that additional bandwidth should be allocated to the second communication;
- request a reservation of additional bandwidth between the first gateway and the second gateway; and
- modify the session information to indicate that both the bandwidth reservation and the additional bandwidth reserved correspond to the second communication.

13. The device of claim 8, wherein the bandwidth is reserved between the first gateway and the second gateway in a communication link connecting the first network and the second network, wherein the communication link has a limited amount of bandwidth.

14. The device of claim 8, wherein the first, second, and third endpoints are selected from: a conference bridge, a telephone, a video phone, a computer, a personal digital assistant, and a cell phone.

15. A computer readable storage medium for storing logic for swapping a bandwidth reservation, the logic encoded in media and operable when executed to:
- receive a request for a first communication session between a first end point in a first network and a second endpoint in a second network, the first communication session routed through a first gateway in the first network and a second gateway in the second network;
- in response to receiving a request for the first communication session, request a bandwidth reservation for the first communication session corresponding to the entire media path between the first end point in the first network and the second endpoint in the second network through the first gateway and the second gateway;
- prior to establishing the first communication session, receiving a confirmation of the requested bandwidth reservation, the confirmation corresponding to an indication that requested bandwidth has been reserved along the entire media path between the first endpoint in the first network and the second endpoint in the second network through the first gateway and the second gateway;
- store session information indicating that the bandwidth reservation corresponds to the first communication session;
- receive a request for a second communication session between the first endpoint and a third endpoint, the third endpoint located in the second network, the second communication session routed through the first gateway and the second gateway;
- determine that the second communication session can use the bandwidth reservation corresponding to the first communication session while the first communication session is in progress;
- modify the session information to indicate that the bandwidth reservation corresponds to the second communication session; and
- request a swap of the bandwidth reservation from the first communication session to the second communication session.

16. The computer readable storage medium of claim 15, the logic further operable when executed to:
- terminate the second communication;
- modify the session information to indicate that the bandwidth reservation corresponds to the first communication; and
- request a swap of the bandwidth reservation from the second communication session to the first communication session.

17. The computer readable storage medium of claim 15, wherein:
- the session information indicates a first port on the first gateway assigned to the first communication session and a second port on the first gateway assigned to the second communication session;
- the bandwidth reservation is associated with the first port when the bandwidth reservation corresponds to the first communication session; and
- modifying the session information comprises associating the bandwidth reservation with the second port.

18. The computer readable storage medium of claim 15, the logic further operable when executed to:
- determine that the first communication session is inactive; and
- in response, request the swap of the bandwidth reservation from the first communication session to the second communication session.

19. The computer readable storage medium of claim 15, the logic further operable when executed to:
- determine that additional bandwidth should be allocated to the second communication;
- request a reservation of additional bandwidth between the first gateway and the second gateway; and
- modify the session information to indicate that both the bandwidth reservation and the additional bandwidth reserved correspond to the second communication.

20. The computer readable storage medium of claim 15, wherein the bandwidth is reserved between the first gateway and the second gateway in a communication link connecting the first network and the second network, wherein the communication link has a limited amount of bandwidth.

21. The computer readable storage medium of claim 15, wherein the first, second, and third endpoints are selected from: a conference bridge, a telephone, a video phone, a computer, a personal digital assistant, and a cell phone.

22. A system for swapping a bandwidth reservation comprising:
- means for receiving a request for a first communication session between a first end point in a first network and a second endpoint in a second network, the first communication session routed through a first gateway in the first network and a second gateway in the second network;
- means for requesting, in response to receiving a request for the first communication session, a bandwidth reservation for the first communication session corresponding to the entire media path between the first end point in the first network and the second endpoint in the second network through the first gateway and the second gateway;

means for receiving, prior to establishing the first communication session, a confirmation of the requested bandwidth reservation, the confirmation corresponding to an indication that requested bandwidth has been reserved along the entire media path between the first endpoint in the first network and the second endpoint in the second network through the first gateway and the second gateway;

means for storing session information indicating that the bandwidth reservation corresponds to the first communication session;

means for receiving a request for a second communication session between the first endpoint and a third endpoint, the third endpoint located in the second network, the second communication session routed through the first gateway and the second gateway;

means for determining that the second communication session can use the bandwidth reservation corresponding to the first communication session while the first communication session is in progress;

means for modifying the session information to indicate that the bandwidth reservation corresponds to the second communication session; and means for requesting a swap of the bandwidth reservation from the first communication session to the second communication session.

23. A system for swapping a bandwidth reservation comprising:

a first network including a first endpoint and a first gateway, a second network including a second endpoint, a third endpoint, and a second gateway; and a call control agent comprising:

session information indicating that a bandwidth reservation corresponds to a first communication session between the first endpoint and the second endpoint, the first communication session routed through the first gateway and the second gateway; and a controller operable to:

receive a request for the first communication session;

request, in response to receiving a request for the first communication session, a bandwidth reservation for the first communication session corresponding to the entire media path between the first end point in the first network and the second endpoint in the second network through the first gateway and the second gateway;

receive, prior to establishing the first communication session, a confirmation of the requested bandwidth reservation corresponding to an indication that requested bandwidth has been reserved along the entire media path between the first endpoint in the first network and the second endpoint in the second network through the first gateway and the second gateway;

receive a request for a second communication session between the first endpoint and the third endpoint, the second communication session routed through the first gateway and the second gateway;

determine that the second communication session can use the bandwidth reservation corresponding to the first communication session while the first communication session is in progress;

modify the session information to indicate that the bandwidth reservation corresponds to the second communication session; and request a swap of the bandwidth reservation from the first communication session to the second communication session.

* * * * *